United States Patent Office 3,546,258
Patented Dec. 8, 1970

3,546,258
1,4-DIAMINO - 5 - (p-AMINO PHENYL) AMINO ANTHRAQUINONES, THE ACID ADDITION AND QUATERNARY AMMONIUM SALTS THEREOF
Gregoire Kalopissis, Paris, Jack Bertrand, Tremblay-les-Gonesses, and Andree Bugaut, Boulogne-sur-Seine, France, assignors to Societe Anonyme dite: L'OREAL, Paris, France
No Drawing. Continuation-in-part of application Ser. No. 426,366, Jan. 18, 1965. This application Mar. 5, 1969, Ser. No. 804,657
Claims priority, application France, Jan. 27, 1964, 961,661
Int. Cl. C09b 1/32
U.S. Cl. 260—378                                7 Claims

ABSTRACT OF THE DISCLOSURE

Hair dye compounds containing 1,4-diamino-5-substituted aminoanthraquinones.

---

This application is a continuation-in-part of application 426,366, filed Jan. 18, 1965, now Patent No. 3,442,-559.

SUMMARY OF THE INVENTION

This invention relates to new anthraquinone dyes that can be used to dye keratinic fibres, and especially to dye human hair and to a process for their preparation.

The compounds of this invention are 1,4-diamino-5-substituted aminoanthraquinone compounds having the formula:

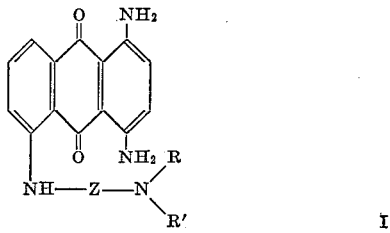

in which Z represents a p-phenylene; an R and R' which can be the same or different, are each a lower alkyl, or together with the nitrogen atom to which they are attached constitute a heterocyclic group, and the quaternary salts thereof, in which

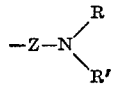

is replaced by:

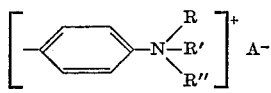

where R and R' have the meanings given above, R" represents a lower alkyl, preferably those having 1-4 carbon atoms, or an aralkyl and A⁻ represents a physiologically acceptable anion such as, for example, a halide such as chloride, bromide, iodide, or a methylsulphate ion, etc. that will not harm the skin or hair. R" can be, for instance an alkyl radical of 1–4 carbon atoms such as methyl, ethyl, butyl, etc. or a benzyl radical.

The term "dyes of the invention" used below refers to the anthraquinones and to their acid addition and quaternary salts.

Where R or R' is a lower alkyl radical it is preferably one of 1–4 carbon atoms, for instance methyl or ethyl. Where

represents a heterocyclic residue, it is preferably a saturated mononuclear heterocyclic residue, for instance a morpholine or piperidino radical. The integer $n$ is preferably 2 or 3.

The tertiary amine and quaternary ammonium salt dyes of the invention have the advantage that they are water-soluble over a very wide pH range, especially from 3 to 9, and thus the solubility of these compounds is such as to satisfy the practical conditions under which hair dyeing must be effected. These dyes have an unexpectedly high resistance to sunlight and possess a great affinity for keratinic fibres, especially live hair. Moreover, they are compatible with the adjuvants which are generally present in dyeing compositions, such as penetration of hair-swelling agents. The dyes of the invention give unexpectedly deep blue shades which have very great intensity and which form a particularly desirable addition to the range of shades which it is possible to obtain with the aid of other anthraquinone dyes.

The dyes of the invention can be used in combination with other dyes, whether or not the latter are anthraquinone dyes and in dyeing compositions suitable for keratinic fibres containing one or more dyes of this invention. These compositions can be, for instance, aqueous solutions, optionally containing other dyes, and wetting, dispersing or penetrating agents, emollients and perfumes. The concentrations of the dyes may, by reason of their high solubility, vary within wide limits and the choice of the concentration depends in practice upon the desired result.

The method of dyeing human hair with the dye compounds of this invention comprises applying to the hair a dyeing composition that contains a dye compound of this invention, allowing sufficient time to elapse after the application for the dyeing effect to be obtained and removing from the hair any unwanted excess of the dyeing composition. The dyeing of the hair is preferably carried out at ambient temperature for about 20 to 30 minutes, and the dyed hair is subsequently rinsed with water, washed and dried.

The present invention also consists in a process for preparing the above-described compounds of Formula I, in which there is reacted together 1,4-diamino-5-nitroanthraquinone and a diamino compound of the formula:

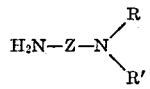

where Z, R and R' have the meanings given above. The said diamino compound can be, for instance, a p-dialkyl-phenylene-diamine of the formula:

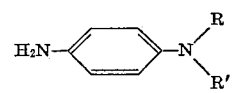

in which $n$, R and R' have the meanings given above.

The quaternisation of the ternary derivatives thus obtained can be effected by using a quaternising agent such as methyl sulphate or an alkyl halide, conveniently in an appropriate solvent.

The invention is illustrated by the following examples:

Example 1.—Preparation of 1,4-diamino-5-(p-dimethyl-aminophenyl)-aminoanthraquinone 56.6 g. of 1,4-diamino-5-nitro-anthraquinone and 200 g. N,N-dimethyl-p-phenylenediamine are heated for 12 hours at a temperature of 115–120° C.

The reaction mixture is poured into 3 liters of water. The crude product obtained is separated and washed with alcohol, the said product melting between 258° and 260° C. when recrystallised from chlorobenzene.

The compound obtained was potentiometrically titrated:

Theoretical molecular weight _____ 372
Molecular weight found _____ 371

Example 2.—Preparation of methyl-[1,4-diamino-5-(p-trimethyl - ammonium)phenylamino - anthraquinone] sulphate This product is prepared from 1,4-diamino-5-(p-dimethylaminophenyl)amino-anthraquinone in solution in nitrobenzene by the action of methyl sulphate for 1 hour at 80° C.

The quaternary compound obtained is separated, this compound melting with decomposition between 200° and 203° C.

Example 3

A dyeing solution according to the invention is prepared by mixing:

methyl-[1,4-diamino-5-(p-trimethylammonium)-
  phenylamino-anthraquinone]sulphate—1 g.
sodium carbonate, q.s. for pH 7
water, q.s. for 100 cm.³

This solution is applied to 100% white hair and allowed to act thereon for 20 minutes at ambient temperature, whereafter the hair is rinsed with water, shampooed, rinsed again and dried.

There is then obtained a "bleu-nattier" coloration.

Other illustrative examples of the tertiary amine and quaternary ammonium compounds of this invention are:

1. 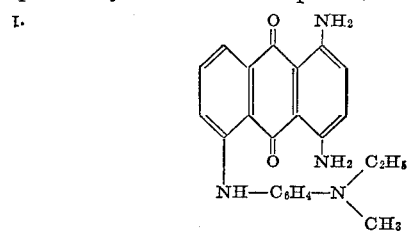

2. 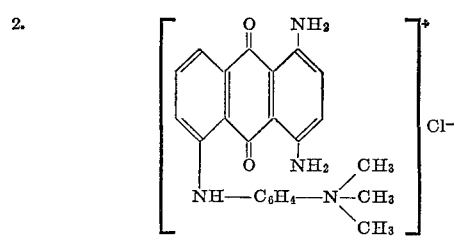

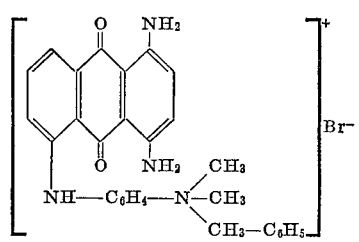

What is claimed is:
1. A compound selected from the group consisting of a tertiary amine having the formula:

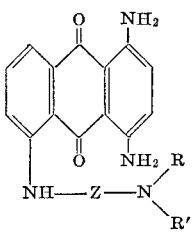

in which Z is p-phenylene; and R and R' are lower alkyl having 1–4 carbon atoms, benzyl or together with the nitrogen atom to which they art attached are morpholino or piperidino,
   the acid addition salts of the compounds of Formula I and
   the quaternary ammonium salts in which

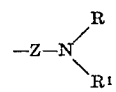

is replaced by

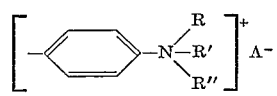

where R and R' have the meanings given above and R" is selected from the group consisting of lower alkyl and benzyl and A⁻ is an anion.

2. A quaternary ammonium salt of claim 1, in which A is selected from the group consisting of chloride, bromide, iodide and methylsulphate.

3. A tertiary amine compound of claim 1.

4. The compound of claim 1, wherein said anthraquinone is 1,4-diamino-5-(p-dimethyl-aminophenyl)amino-anthraquinone.

5. The quaternary ammonium salt of claim 1, wherein said salt is methyl-[1,4-diamino-5-(p-trimethyl-ammonium)phenylamino-anthraquinone]sulphate.

6. A quaternary ammonium salt of claim 1, wherein A⁻ is selected from the group consisting of halides and methylsulphate.

7. A quaternary ammonium salt of claim 1.

References Cited

UNITED STATES PATENTS 3,232,934  2/1966  Hoare _____ 260—247.1

FOREIGN PATENTS 807,241  1/1959  Great Britain.

ALEX MAZEL, Primary Examiner
J. TOVAR, Assistant Examiner

U.S. Cl. X.R.
260—247.1, 247.2, 247.5, 272